United States Patent Office 3,408,382
Patented Oct. 29, 1968

3,408,382
PHENYL-BENZENE-SULFONIC ACID ESTERS
Wilhelm Sirrenberg, Sprockhoevel, Günter Unterstenhöfer, Opladen, and Ingeborg Hammann, Cologne, Germany, assignors to Farbenfabriken Bayer Aktiengesellschaft, Leverkusen, Germany, a corporation of Germany
No Drawing. Filed Mar. 16, 1966, Ser. No. 534,629
Claims priority, application Germany, Mar. 20, 1965, F 45,583
10 Claims. (Cl. 260—456)

ABSTRACT OF THE DISCLOSURE

Alkylmercapto-, haloalkylmercapto-, cycloalkylmercapto-, and halocycloalkylmercapto-substituted phenyl esters of unsubstituted and 4-halo-substituted benzene sulfonic acids, which possess acaricidal properties and which may be produced by conventional methods.

---

The present invention relates to particular new phenyl-benzene-sulfonic acid esters, which have acaricidal properties, to their pesticidal compositions with carrier vehicles, and to methods for the preparation and use thereof.

It is known that diethyl-p-nitrophenyl thiophosphate (A) can be used for combating mites. This compound has attained a very substantial practical importance.

It is an object of the present invention to provide particular new phenyl-benzene-sulfonic acid esters which possess valuable pesticidal, and especially acaricidal, properties, to provide active compositions in the form of mixtures of such compounds with solid and liquid dispersible carrier vehicles, to provide a process for producing such compounds and to provide methods of using such compounds in a new way, especially for combating pests, and especially acarids.

Other and further objects of the present invention will become apparent from a study of the within specification and accompanying examples.

It has now been found in accordance with the present invention that the particular new phenyl-benzene-sulfonic acid esters having the general formula:

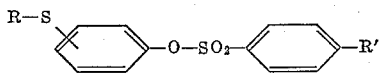

in which R represents a member selected from the group consisting of alkyl, haloalkyl, cycloalkyl, and halocycloalkyl, and R' represents a member selected from the group consisting of hydrogen and halogen, have strong pesticidal, and especially acaricidal properties.

It has been further found in accordance with the present invention that the particular new phenyl-benzene-sulfonic acid esters of general Formula I may be obtained by the process which comprises reacting phenols of the general formula:

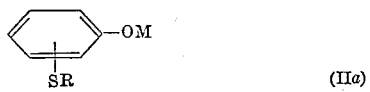

in which M represents a member selected from the group consisting of hydrogen and an equivalent of a metal and R is the same as defined above, with benzene-sulfonic acid halides of the general formula:

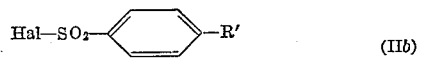

in which Hal represents a halogen atom and R' is the same as defined above, optionally in the presence of acid-binding agents.

It is surprising that the particular new compounds according to the present invention have a higher acaricidal activity than the previously known diethyl-p-nitrophenyl thiophosphate (A). Thus, these particular new compounds constitute a valuable addition to the art.

In accordance with one particular embodiment of the present invention, when 4-methylmercapto-phenol and benzene-sulfonic acid chloride are used as starting materials and the reaction is carried out in the presence of sodium hydroxide, then the course of the reaction can be illustrated by the following equation:

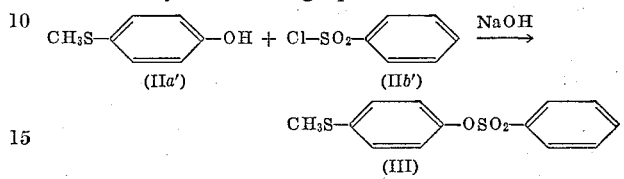

The phenols which can be used as starting material are clearly characterized by general Formula IIa. In this formula, R preferably represents an alkyl radical containing 1 to 5 carbon atoms, such as a methyl, ethyl, propyl, isobutyl or pentyl radical. These radicals can be substituted by halogen, i.e. by bromine and iodine and especially by chlorine and fluorine. R also preferably represents a cycloalkyl radical containing 5 to 8 carbon atoms, such as a cyclophenyl, cyclohexyl or cyclooctyl radical. The cycloalkyl radicals can be substituted in the same way as the alkyl radicals.

The symbol M preferably represents an equivalent of an alkali metal, especially potassium or sodium, or of an earth alkaline metal, especially magnesium, calcium or barium.

The benzene-sulfonic acid halides used as starting material are clearly characterized by general Formula IIb. In this formula, Hal preferably represents a chlorine or bromine atom and R' preferably stands for a hydrogen atom or for a fluorine, iodine or especially, for a chlorine or bromine atom.

The various phenols and benzene-sulfonic acid halides usable as starting materials in accordance with the process of the present invention are known.

Examples of diluents for the reaction mixture are water and all inert organic solvents. These typically include hydrocarbons, such as benzene, toluene, xylene and benzine, and halogenated hydrocarbons, such as chlorobenzene; as well as ethers, such as diethyl ether, dioxan, dipropyl ether and tetrahydrofuran; and ketones, such as diethyl ketone, methyl ethyl ketone and cyclopentanone. Mixtures of these diluents can also be used.

All conventional acid-binding agents can be used for the reaction. When the operation is carried out in an aqueous medium, it is expedient to use alkali metal hydroxides, such as potassium hydroxide or sodium hydroxide or alkali metal carbonates, such as potassium carbonate or sodium carbonate. When the process is carried out in an organic solvent, it is expedient to use amines, such as pyridine, picoline, lutidine, dimethyl aniline, diethyl aniline, trimethylamine or triethylamine.

The reaction temperatures may be varied within a fairly wide range, since the compounds according to the invention are stable. In general, the reaction is carried out substantially between about 20 and 150° C., but it is also possible to go beyond or to remain below these temperatures.

To carry out the process according to the present invention, the starting materials are expediently used in approximately equimolar amounts. However, it is also possible to deviate from these proportions. The acid-binding agents are also used in equimolar quantities, referred to the corresponding amount of hydrohalic acid. An excess of up to 0.2 mol of the acid-binding agent may be of advantage. When pyridine and related compounds are used as acid-binding agents, these can, at the same time, be used as the diluent.

The reaction mixture is worked up in the usual manner, for example by distillation or recrystallization. It is also possible to dissolve the new compounds obtained in organic solvents and to purify them by shaking with aqueous alkali metal hydroxide solutions. Any excess or unreacted alkyl-mercaptophenol is thereby dissolved in the form of phenolate and any sulfonic acid halide that may still be present is hydrolized and dissolved. In the case of sparingly soluble sulfonic acid halides, it is necessary to work at a somewhat elevated temperature. Thus, the esters can be easily purified.

The particular new compounds according to the present invention have strong pesticidal, and particularly acaricidal, effects but only a low toxicity to warm-blooded creatures and a low phytotoxicity. The effects appear rapidly and are long-lasting. The compounds can, therefore, be used with good results for combating mites (Acarina). Thus, for combating mites, the compounds of general Formula I may be applied to a mite habitat alone or in admixture with a solid or liquid diluent or carrier.

Especially important mites contemplated herein are the spider mites (Tetranychidae), such as the common spider mite (*Tetranychus urticae*), the fruit tree spider mite (*Paratetranychus pilosus*), and the like; gall mites, such as the red currant gall mite (*Eriophyes ribis*) and tarsonemides, such as *Tarsonemus pallidus*, and the like; and ticks, and the like.

Advantageously, the active compounds according to the present invention are highly effective not only against the mites themselves but also against their eggs and larvae as well.

Thus, the new compounds of the instant invention can be used as acaricides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35-38). The following may be chiefly considered for use as carrier vehicles for this purpose: dispersible liquid diluent carriers, such as aromatic hydrocarbons (for instance, benzene, toluene, xylene, etc.), halogenated especially chlorinated, aromatic hydrocarbons (for instance, chlorobenzenes), paraffins (for instance, petroleum fractions), chlorinated aliphatic hydrocarbons (for instance, methylene chloride, etc), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1-95% by weight, and preferably 0.5-90% by weight, of the mixture, whereas carrier composition mixtures suitable for direct application or field application generally contemplate those in which the active compound is present in an amount substantially between about 0.001 and 5% by weight, and preferably 0.001 and 3% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.001 and 95% by weight of the mixture.

Furthermore, the present invention contemplates methods of selectively controlling and combating acarids, which comprise applying to at least one of (a) such acarids and (b) their habitat, an acaricidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring, and the like.

The following example is given for the purpose of illustrating, while not limiting, the pesticidal, and more particularly the acaricidal, utility of the new compounds according to the present invention:

EXAMPLE 1

Tetranychus test

Solvent: 3 parts by weight dimethyl formamide;
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Bush beans (*Phaseolus vulgaris*), which have a height of approximately 10-30 cm., are sprayed with the preparation of the given active compound until dripping wet. The bush beans are heavily infested with common spider mites (*Tetranychus urticae*) in all stages of development.

After the specified period of time, the effectiveness of the preparation of such active compound is determined by counting the dead mites. The degree of destruction thus obtained is expressed percentagewise: 100% indicates that all of the spider mites are killed, whereas 0% indicates that none of them is killed.

The active compounds, their concentrations, the evaluation time and the results obtained can be seen from the following Table 1:

TABLE 1.—PLANT-DAMAGING MITES

| Active compound | | Concentrations of active compound in percent | Degree of destruction in percent after 8 days |
|---|---|---|---|
| Diethyl-p-nitrophenyl thiophosphate (Known) | (A) | 0.2 | 20 |
| $CH_3S-\langle\rangle-O-SO_2-\langle\rangle$ | (III') | 0.2<br>0.02<br>0.002 | 100<br>97<br>90 |
| $\begin{array}{c}CH_3S\\|\\\langle\rangle-O-SO_2-\langle\rangle\end{array}$ | (IV) | 0.2<br>0.02 | 100<br>50 |
| $C_2H_5S-\langle\rangle-O-SO_2-\langle\rangle$ | (V) | 0.2<br>0.02 | 100<br>70 |
| $\begin{array}{c}CH_3S\\|\\\langle\rangle-O-SO_2-\langle\rangle-Cl\end{array}$ | (VI) | 0.2<br>0.02 | 100<br>90 |
| $C_2H_5S-\langle\rangle-O-SO_2-\langle\rangle-Cl$ | (VII) | 0.2 | 100 |
| $CH_3S-\langle\rangle-O-SO_2-\langle\rangle-F$ | (VIII) | 0.02<br>0.004 | 100<br>98 |
| $C_2H_5S-\langle\rangle-O-SO_2-\langle\rangle-F$ | (IX) | 0.2<br>0.02 | 98<br>70 |

The following examples are given for the purpose of illustrating, while not limiting, the production process in accordance with the present invention:

EXAMPLE 2

(III'')    $CH_3S-\langle\rangle-O-SO_2-\langle\rangle$ 44 grams (1.1 mol) of sodium hydroxide are dissolved in 800 cc. of water. 140 grams (1 mol) of p-methylmercaptophenol are added to this solution, which is then stirred at 60° C. for 30 minutes until the phenol has dissolved. The reaction mixture is then cooled to 20–30° C., and a solution of 177 g. of benzene sulfochloride in 100 cc. of acetone is added dropwise at this temperature, within the course of 30 minutes. Stirring is continued at 50° C. for 1.5 hours to complete the reaction and the reaction mixture is then allowed to cool, while stirring. The product, initially obtained in the form of an oil, thereby crystallizes out. It is filtered off with suction and washed with water until neutral. The crude product has a melting point of 61° C. After recrystallization from methanol, the product, p-methylmercaptophenyl-benzene sulfonic acid ester, is obtained in the form of white needles with a melting point of 64° C. The yield is almost quantitative.

EXAMPLE 3

(V')    $C_2H_5S-\langle\rangle-OSO_2-\langle\rangle$ 154 grams (1 mol) of 4-ethylmercapto-phenol and 180 g. of benzene sulfochloride are dissolved in 1 litre of benzene. 160 cc. of pyridine are added dropwise to this solution and the mixture is boiled under reflux for 3 hours. After cooling, the precipitated pyridine hydrochloride is filtered off with suction and the filtrate evaporated in a vacuum. The residue, 4-ethylmercaptophenyl-benzene sufonic acid ester, is distilled; B.P. 172° C./0.01 mm. Hg; $n_D^{25}$ 1.5872. The yield is 235 g. (80% of theory).

The following compounds can be prepared in an analogous manner using corresponding molar amounts of the starting materials:

(IV''')    $\begin{array}{c}CH_3S\\|\\\langle\rangle-O-SO_2-\langle\rangle\end{array}$    $n_D^{20}=1.5992$ m-methylmercaptophenyl-benzene-sulfonic acid ester (VII')    $C_2H_5S-\langle\rangle-O-SO_2-\langle\rangle-Cl$    $n_D^{20}=1.5968$ p-ethylmercaptophenyl-p'-chlorobenzene-sulfonic acid ester (VI')    $\begin{array}{c}CH_3S\\|\\\langle\rangle-O-SO_2-\langle\rangle-Cl\end{array}$    $n_D^{20}=1.6095$ m-methylmercaptophenyl-p'-chlorobenzene sulfonic acid ester

EXAMPLE 4

In the same way utilizing the procedure of Example 3, with corresponding molar amounts of the following starting materials, respectively:

(a) p-(Isopropyl-mercapto) phenol and p-bromo-benzene sulfochloride;
(b) m-Tert.-butylmercapto) phenol and p-chlorobenzene sulfochloride;
(c) o-(2-chloroethylmercapto) phenol and p-chlorobenzene sulfochloride;
(d) p-(5-fluoropentylmercapto) phenol and benzene sulfochloride;
(e) p-(Cyclohexylmercapto) phenol and benzene sulfochloride;
(f) m-(Cyclooctylmercapto) phenol and p-bromobenzene sulfochloride;
(g) p-(4-fluoro-cyclohexylmercapto) phenol and p-bromo-benzene sulfochloride;
(h) o-(3-chloro-cyclooctylmercapto) phenol and p-chloro-benzene sulfochloride;

the corresponding final products, respectively, are formed:

(a') 4-isopropylmercaptophenyl-4'-bromo-benzene sulfonic acid ester;
(b') 3-tert.-butylmercaptophenyl-4'-chlorobenzene sulfonic acid ester;
(c') 2-(β-chloroethylmercapto) phenyl - 4'-chlorobenzene sulfonic acid ester;
(d') 4-(ω-fluoropentylmercapto) phenyl-benzene sulfonic acid ester;
(e') 4 - cyclohexylmercaptophenyl - benzene sulfonic acid ester;
(f') 3-cyclooctylmercaptophenyl-4'-bromo-benzene sulfonic acid ester;
(g') 4 - (4'-fluoro-cyclohexyl-mercapto) phenyl - 4''-bromo-benzene sulfonic acid ester;
(h') 2 - (3'-chloro-cyclooctyl-mercapto) phenyl - 4''-chlorobenzene sulfonic acid ester.

Thus, in accordance with the present invention, in the foregoing formulae:

R represents alkyl, such as methyl, ethyl, n-propyl, isopropyl, n-butyl, isobutyl, sec.-butyl, tert.-butyl, pentyl, and the like, especially alkyl having 1–5 carbon atoms, and most especially methyl, ethyl, propyl, isobutyl, and pentyl; haloalkyl, such as chloro-, bromo-, fluoro-, and iodo-alkyl, especially chloro-alkyl and fluoro alkyl, preferably with such alkyl moiety having from 1–5 carbon atoms; cycloalkyl such as cyclopentyl, cyclohexyl, cycloheptyl, cyclooctyl, and the like, especially cycloalkyl having 5–8 ring carbon atoms, and most especially cyclopentyl, cyclohexyl and cyclooctyl; and halocycloalkyl such as chloro-, bromo-, fluoro-, and iodo-cycloalkyl i.e. of the foregoing type, especially chloro-cycloalkyl, and fluoro-cycloalkyl, preferably those having 5–8 ring carbon atoms in the cycloalkyl moiety; and R′ represents hydrogen or halogen, such as chloro, bromo, fluoro and iodo, especially chloro, bromo and fluoro.

In accordance with a preferred embodiment of the present invention, R is alkyl having 1–5 carbon atoms, chloroalkyl having 1–5 carbon atoms, fluoroalkyl having 1–5 carbon atoms, cycloalkyl having 5–8 ring carbon atoms, chlorocycloalkyl having 5–8 ring carbon atoms, and fluorocycloalkyl having 5–8 ring carbon atoms, and R′ is hydrogen, chloro and fluoro.

More especially, R is alkyl having 1–5 carbon atoms and R′ is hydrogen, chloro or fluoro.

All of the foregoing compounds in accordance with the present invention possess the desired strong acaricidal properties with only a concomitantly low toxicity toward warm-blooded creatures as well as a comparatively low phytotoxicity, whereby such compounds may be used to control, combat and/or eliminate acarids, such as mites, in adult form as well as in egg or larvae form.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. Phenyl-benzene-sulfonic acid ester having the formula

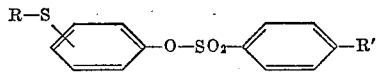

in which R represents a member selected from the group consisting of alkyl having 1–5 carbon atoms, monohaloalkyl having 1–5 carbon atoms, cycloalkyl having 5–8 ring carbon atoms, and monohalocycloalkyl having 5–8 ring carbon atoms, and R′ represents a member selected from the group consisting of hydrogen and halogen.

2. Ester according to claim 1 wherein R is selected from the group consisting of alkyl having 1–5 carbon atoms, monochloroalkyl having 1–5 carbon atoms, monofluoroalkyl having 1–5 carbon atoms, cycloalkyl having 5–8 ring carbon atoms, monochlorocycloalkyl having 5–8 carbon atoms, and monofluorocycloalkyl having 5–8 carbon atoms, and R′ is selected from the group consisting of hydrogen, chlorine and fluorine.

3. Ester according to claim 1 wherein R is alkyl having 1–5 carbon atoms, and R′ is selected from the group consisting of hydrogen, chlorine, and fluorine.

4. Ester according to claim 1 wherein said ester is p-methylmercaptophenyl-benzene sulfonic acid ester having the formula

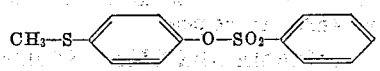

5. Ester according to claim 1 wherein said ester is m-methylmercaptophenyl-benzene sulfonic acid ester having the formula

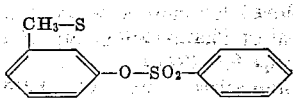

6. Ester according to claim 1 wherein said ester is p-ethylmercaptophenyl-benzene sulfonic acid ester having the formula

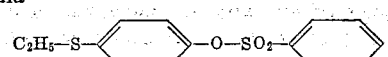

7. Ester according to claim 1 wherein said ester is m-methylmercaptophenyl - p′ - chlorobenzene sulfonic acid ester having the formula

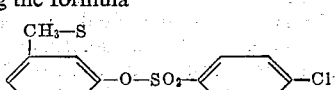

8. Ester according to claim 1 wherein said ester is p-ethylmercaptophenyl-p′-chlorobenzene sulfonic acid ester having the formula

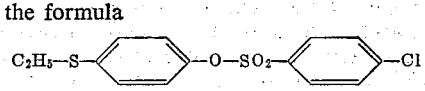

9. Ester according to claim 1 wherein said ester is p-methylmercaptophenyl - p′ - fluorobenzene sulfonic acid ester having the formula

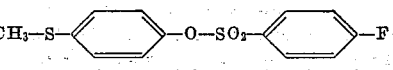

10. Ester according to claim 1 wherein said ester is p-ethylmercaptophenyl-p′-fluorobenzene sulfonic acid ester having the formula

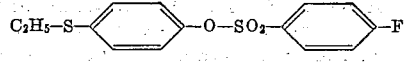

References Cited

UNITED STATES PATENTS 2,567,839  9/1951  Britton et al. _____ 260—456

CHARLES B. PARKER, *Primary Examiner.*

L. C. MARUZO, *Assistant Examiner.*